United States Patent
Floyd et al.

(10) Patent No.: US 11,726,817 B2
(45) Date of Patent: Aug. 15, 2023

(54) SCHEDULING MULTIPLE PROCESSES WITH VARYING DELAY SENSITIVITY

(71) Applicant: Red Hat, Inc., Raleigh, NC (US)

(72) Inventors: Jered J. Floyd, Boston, MA (US); Ali Ok, Ankara (AR)

(73) Assignee: Red Hat, Inc., Raleigh, NC (US)

( * ) Notice: Subject to any disclaimer, the term of this patent is extended or adjusted under 35 U.S.C. 154(b) by 207 days.

(21) Appl. No.: 17/033,041

(22) Filed: Sep. 25, 2020

(65) Prior Publication Data

US 2022/0100572 A1    Mar. 31, 2022

(51) Int. Cl.
*G06F 9/48* (2006.01)
*G06F 9/50* (2006.01)
*G06N 20/00* (2019.01)

(52) U.S. Cl.
CPC .............. *G06F 9/4881* (2013.01); *G06F 9/48* (2013.01); *G06F 9/4806* (2013.01); *G06F 9/4843* (2013.01); *G06F 9/50* (2013.01); *G06F 9/505* (2013.01); *G06F 9/5038* (2013.01); *G06N 20/00* (2019.01)

(58) Field of Classification Search
CPC ........ G06F 9/4881; G06F 9/4887; G06F 9/50; G06F 9/505; G06F 9/5038; G06F 9/4806; G06F 9/4883
See application file for complete search history.

(56) References Cited

U.S. PATENT DOCUMENTS

| | | | |
|---|---|---|---|
| 7,684,333 B1 * | 3/2010 | Dasylva | H04L 5/0064 370/468 |
| 7,698,713 B2 | 4/2010 | Erlingsson | |
| 7,739,479 B2 | 6/2010 | Bordes et al. | |
| 8,719,556 B2 | 5/2014 | Mendes et al. | |
| 9,170,810 B2 | 10/2015 | Koutyrine et al. | |
| 9,946,575 B2 | 4/2018 | David | |

(Continued)

OTHER PUBLICATIONS

Wong et al, "Evaluating the Easy-Backfill Job Scheduling of Static Workloads on Clusters", 2007 IEEE International Conference on Cluster Computing, pp. 64-73 (Year: 2007).*

(Continued)

*Primary Examiner* — Charles M Swift
(74) *Attorney, Agent, or Firm* — Dority & Manning, P.A.

(57) ABSTRACT

Scheduling multiple processes with varying delay sensitivity is disclosed herein. In one example, a processor device iteratively executes a processing workload that includes a fixed-execution-time process and an adjustable-execution-time process. During each iteration of the processing workload, the processor device first determines, for that iteration, a maximum cycle time interval during which both the fixed-execution-time process and an adjustable-execution-time process will execute. The processor device further determines a maximum execution time interval for the adjustable-execution-time process, based on the maximum cycle time interval and a fixed execution time interval for the fixed-execution-time process. The processor device then modifies an adjustable execution time interval for adjustable-execution-time process in the current iteration of the processing workload based on the maximum execution time interval.

20 Claims, 9 Drawing Sheets

(56) References Cited

U.S. PATENT DOCUMENTS

| | | | | |
|---|---|---|---|---|
| 2013/0097606 A1* | 4/2013 | Coombe | ............... | G06F 9/4887 718/102 |
| 2014/0165070 A1* | 6/2014 | Persikov | ............... | G06F 9/4881 718/103 |
| 2015/0178126 A1* | 6/2015 | Modani | ................ | G06F 9/4881 718/102 |
| 2020/0053018 A1* | 2/2020 | White | .................... | H04L 47/11 |

OTHER PUBLICATIONS

Joselli, Mark et al., "An Architecture with Automatic Load Balancing and Distribution for Digital Games," 2010 Brazilian Symposium on Games and Digital Entertainment, Available online at https://dl.acm.org/citation.cfm?id=1990734, Nov. 2010, pp. 59-70.

Zhang, Tianyu et al., "Learning-based Offloading of Tasks with Diverse Delay Sensitivities for Mobile Edge Computing," Available online at https://web.njit.edu/~borcea/papers/ieee-globecom19.pdf, 2019, 6 pages.

\* cited by examiner

SCHEDULING MULTIPLE PROCESSES WITH VARYING DELAY SENSITIVITY

BACKGROUND

Some processing workloads executed by processor devices are performed iteratively (often tens, hundreds, or thousands of times per second). A processing workload may include processes that have varying delay sensitivity. For instance, a first process of the processing workload may have a fixed execution time and a second process may have an adjustable execution time, both of which are to be accomplished within a maximum cycle time interval for the iteration.

SUMMARY

The examples disclosed herein relate to scheduling multiple processes with varying delay sensitivity. In some embodiments, a processor device of a computing device iteratively performs a processing workload that includes a first process that is performed within a fixed execution time interval and a second process that is performed within an adjustable execution time interval. Each iteration of the processing workload is performed within a maximum cycle time interval, and thus a sum of the fixed execution time interval and the adjustable execution time interval is less than or equal to the maximum cycle time interval. During each iteration of the processing workload, the processor device determines the maximum cycle time interval for the iteration (based on, e.g., a predefined time interval, a time interval defined by a rate of an external process, and/or a time interval defined by a desired quality of results, as non-limiting examples). The processor device next determines a maximum execution time interval for the second process based on the maximum cycle time interval and the fixed execution time interval. For instance, the maximum execution time interval may be calculated as a difference between the maximum cycle time interval and the amount of time taken to execute the first process, a difference between the maximum cycle time interval and a moving average of first process execution times, a difference between the maximum cycle time interval and a configured execution time of the first process, or a difference between the maximum cycle time interval and a predicted execution time of the first process generated by a machine learning (ML) model, as non-limiting examples.

The processor device then modifies the adjustable execution time interval for the second process based on the maximum execution time interval (e.g., to ensure that the second process is performed within the maximum execution time interval for the second process). For instance, the adjustable execution time interval may be modified by selecting one of a plurality of different algorithms for performing functionality of the second process and/or by selecting one of a plurality of different parameters for the second process, as non-limiting examples. In this manner, the processor device can maximize the efficient use of the available time for executing the second process while abiding by the constraints imposed by the maximum cycle time interval of the processing workload and the fixed execution time interval of the first process.

In another example, a method is provided. The method comprises iteratively performing, by a processor device of a computing device, a processing workload, wherein each iteration of the processing workload is performed within a maximum cycle time interval, the processing workload comprises a first process and a second process, the first process is performed within a fixed execution time interval, and the second process is performed within an adjustable execution time interval. The method further comprises, during each iteration of the processing workload, determining, for the iteration, the maximum cycle time interval for the iteration. The method also comprises determining, for the iteration, a maximum execution time interval for the second process based on the maximum cycle time interval and the fixed execution time interval. The method additionally comprises modifying, for the iteration, the adjustable execution time interval for the second process based on the maximum execution time interval.

In another example, a computing device is provided. The computing device comprise a system memory and a processor device coupled to the system memory. The processor device is to iteratively perform a processing workload, wherein each iteration of the processing workload is performed within a maximum cycle time interval, the processing workload comprises a first process and a second process, the first process is performed within a fixed execution time interval, and the second process is performed within an adjustable execution time interval. The processor device is further to, during each iteration of the processing workload, determine, for the iteration, the maximum cycle time interval for the iteration. The processor device is also to determine, for the iteration, a maximum execution time interval for the second process based on the maximum cycle time interval and the fixed execution time interval. The processor device is additionally to modify, for the iteration, the adjustable execution time interval for the second process based on the maximum execution time interval.

In another example, a computer program product is provided. The computer program product is stored on a non-transitory computer-readable storage medium, and includes computer-executable instructions to cause a processor device to iteratively perform a processing workload, wherein each iteration of the processing workload is performed within a maximum cycle time interval, the processing workload comprises a first process and a second process, the first process is performed within a fixed execution time interval, and the second process is performed within an adjustable execution time interval. The computer-executable instructions further cause the processor device to, during each iteration of the processing workload, determine, for the iteration, the maximum cycle time interval for the iteration. The computer-executable instructions also cause the processor device to determine, for the iteration, a maximum execution time interval for the second process based on the maximum cycle time interval and the fixed execution time interval. The computer-executable instructions additionally cause the processor device to modify, for the iteration, the adjustable execution time interval for the second process based on the maximum execution time interval.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
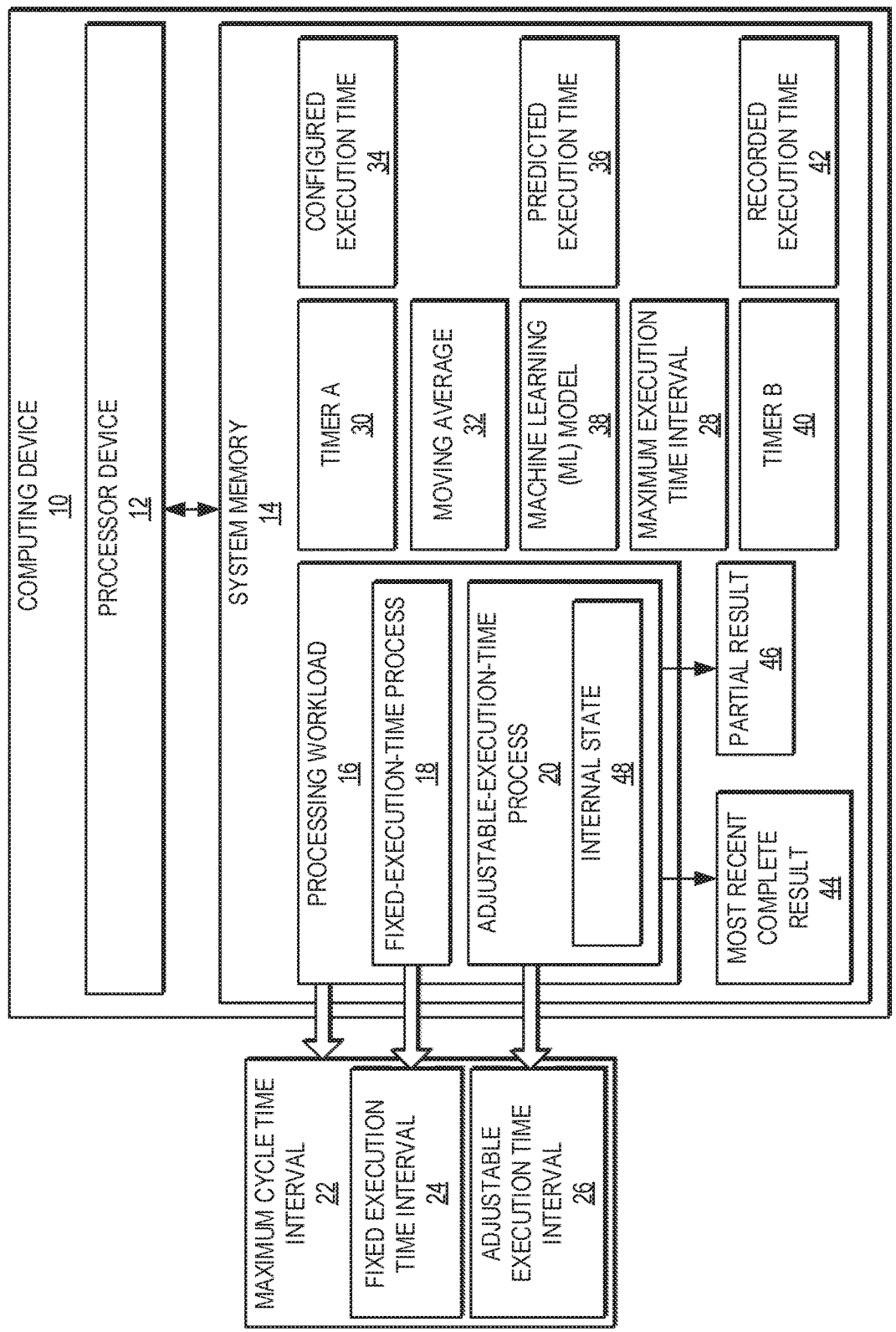
FIG. 1 is a block diagram of a computing device in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, some processing workloads executed by processor devices are performed iteratively (often tens, hundreds, or thousands of times per second). A processing workload may include processes that have varying delay sensitivity (e.g., a first process of the processing workload may have a fixed execution time and a second process may have an adjustable execution time, both of which are to be accomplished within a maximum cycle time interval for the iteration). For example, a client-server game may involve a continual processing workload loop. During each iteration of the processing workload, a game server performs a first process for receiving and processing input messages, analyzing interactions of virtual objects in the game based on the input messages, and outputting messages to the client game applications based on the interactions. The game server may also perform a second process for updating a simulation model of the game environment during each iteration of the processing workload. The second process may have an adjustable execution time, such that the frequency of updates to the simulation model, the detail with which the simulation model is rendered, and/or other factors may be adjusted to modify the execution time of the second process.

Other applications may also include iterative processing of workloads involving both fixed-execution-time processes and adjustable-execution-time processes. Such applications may include, as non-limiting examples, performing 5G virtual Radio Access Network (vRAN) processing for network efficiency, analyzing sensor and image data for manufacturing quality control, improving artificial intelligence (AI) and machine learning (ML) models based on live feedback, selecting failsafe defaults in safety-related applications, and performing video/audio transcoding for streaming applications.

Because the maximum cycle time interval of a processing workload may be inconstant (e.g., may be affected by external factors and/or by a desired quality of results, as non-limiting factors), a processor device may need to ensure that the first process and the second process are both able to execute within the maximum cycle time interval available for a given iteration of the processing workload. Accordingly, examples disclosed herein relate to scheduling multiple processes with varying delay sensitivity. In some embodiments, a processor device of a computing device iteratively performs a processing workload that includes a first process that is performed within a fixed execution time interval and a second process that is performed within an adjustable execution time interval. It is to be understood that, as used herein, the term "fixed execution time" refers to an execution time that remains relatively constant (e.g., within a given range that can be predetermined) across multiple iterations of the processing workload, but that may vary iteration to iteration. Each iteration of the processing workload is performed within a maximum cycle time interval, and thus a sum of the fixed execution time interval and the adjustable execution time interval is less than or equal to the maximum cycle time interval.

During each iteration of the processing workload, the processor device determines the maximum cycle time interval for the iteration (based on, e.g., a predefined time interval, a time interval defined by a rate of an external process, and/or a time interval defined by a desired quality of results, as non-limiting examples). The processor device next determines a maximum execution time interval for the second process based on the maximum cycle time interval and the fixed execution time interval. For instance, the maximum execution time interval may be calculated as a difference between the maximum cycle time interval and the amount of time taken to execute the first process, a difference between the maximum cycle time interval and a moving average of first process execution times, a difference between the maximum cycle time interval and a configured execution time of the first process, or a difference between the maximum cycle time interval and a predicted execution time of the first process generated by an ML model, as non-limiting examples.

The processor device then modifies the adjustable execution time interval for the second process based on the maximum execution time interval (e.g., to ensure that the second process is performed within the maximum execution time interval for the second process). For instance, the adjustable execution time interval may be modified by selecting one of a plurality of different algorithms for performing functionality of the second process and/or by selecting one of a plurality of different parameters for the second process, as non-limiting examples. In this manner, the processor device can maximize the efficient use of the available time for executing the second process while abiding by the constraints imposed by the maximum cycle time interval of the processing workload and the fixed execution time interval of the first process.

In some examples, the processor device may determine that a current execution of the second process will not complete during the adjustable execution time interval for the second process. The processor device thus may provide an intermediate result (e.g., a most recent complete result of the second process from a previous iteration of the processing workload, or a partial result of the second process from a current iteration of the processing workload, as non-limiting examples) as a result of the second process. The processor device may then persist an internal state of the second process to enable continued execution of the second process during a next iteration of the processing workload.

To illustrate a computing device on which examples may be practiced, FIG. 1 is provided. In FIG. 1, a computing device 10 includes a processor device 12 communicatively coupled to a system memory 14. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

The processor device 12 of FIG. 1 iteratively executes a processing workload 16 that includes a fixed-execution-time process 18 (referred to herein as a "first process 18") and an adjustable-execution-time process 20 (referred to herein as a "second process 20"). Each iteration of the processing workload 16 is associated with a maximum cycle time interval 22 during which the iteration is executed, and which may vary between iterations of the processing workload 16. Additionally, the first process 18 is associated with a fixed execution time interval 24, while the second process 20 is associated with an adjustable execution time interval 26. Because both the first process 18 and the second process 20 are executed within each iteration of the processing workload 16, the sum of the fixed execution time interval 24 and the adjustable execution time interval 26 must be less than or equal to the maximum cycle time interval 22. However, because the fixed execution time interval 24 remains relatively constant, the processor device 12 may need to modify the adjustable execution time interval 26 to ensure that each iteration of the processing workload 16 can be completed during the maximum cycle time interval 22.

Accordingly, during each iteration of the processing workload 16, the processor device 12 first determines, for that iteration, the maximum cycle time interval 22. For example, the maximum cycle time interval 22 may be determined based on a predefined time interval, e.g., that is hardcoded or configured by a user or an automatic process. According to some examples, the maximum cycle time interval 22 may be determined based on a time interval that is defined by a rate of an external process, such as a network round-trip time, production line manufacturing speed, and the like, as non-limiting examples. Some examples may provide that the maximum cycle time interval 22 may be determined based on a desired quality of results, e.g., where the maximum cycle time interval 22 is longer for higher quality of results and shorter for lower quality of results.

The processor device 12 further determines a maximum execution time interval 28 for the second process 20, based on the maximum cycle time interval 22 and the fixed execution time interval 24. In some examples, the processor device 12, during a given iteration of the processing workload 16, may start a timer ("TIMER A") 30 when execution of the first process 18 begins, and may stop the timer 30 when execution of the first process 18 ends. The processor device 12 thus may determine an amount of time taken to execute the first process 18, and may calculate the maximum execution time interval 28 as a difference between the maximum cycle time interval 22 and the amount of time taken to execute the first process 18. Some examples may provide that the timer 30 is used to update a moving average 32 of first process execution times. In such examples, the processor device 12 may calculate the maximum execution time interval 28 as a difference between the maximum cycle time interval 22 and the moving average 32. The moving average 32 in some examples may comprise a weighted moving average that assigns more weight to recent execution times for the first process 18. According to some examples, the maximum execution time interval 28 may be calculated as a difference between the maximum cycle time interval 22 and a configured execution time 34 of the first process, or as a difference between the maximum cycle time interval 22 and a predicted execution time 36 of the first process generated by an ML model 38.

Once the maximum execution time interval 28 for the second process 20 is determined, the processor device 12 modifies the adjustable execution time interval 26 for the current iteration of the processing workload 16 based on the maximum execution time interval 28. In particular, the processor device 12 in some examples may modify the adjustable execution time interval 26 to ensure that the second process 20 is performed within the maximum execution time interval 28 for the second process (which in turn ensures that both the first process 18 and the second process 20 are executed within the maximum cycle time interval 22). In some examples, the processor device 12 may start a timer ("TIMER B") 40 during a given iteration of the processing workload 16 when execution of the second process 20 begins, and may stop the timer 40 when execution of the second process 20 ends. In this manner, the processor device 12 may use the timer 40 to determine and record an amount of time taken to execute the second process 20 (i.e., the recorded execution time 42). In a subsequent iteration, the processor device 12 may modify the adjustable execution time interval 26 for the second process 20 based on the recorded execution time 42 taken to execute the second process 20 in a previous iteration of the processing workload 16.

The processor device 12 according to some examples may also modify the adjustable execution time interval 26 for the second process 20 by, e.g., selecting one of a plurality of different algorithms for performing functionality of the second process 20, and/or by selecting one of a plurality of different parameters for the second process 20. For instance, if more time is available in the maximum execution time interval 28, the processor device 12 may select an algorithm and/or a parameter for the second process 20 that provides more precise or higher quality results at a cost of longer execution time. Conversely, if less time is available in the maximum execution time interval 28, the processor device 12 may select an algorithm and/or a parameter for the second process 20 that provides less precise or lower quality results, but in less time.

In some examples, the processor device 12 may determine that a current execution of the second process 20 will not complete during the adjustable execution time interval 26 for the second process 20. This may occur, for example, due to an unpredicted variation in execution time of the second process 20. Some such examples may provide that the processor device 12 may provide a most recent complete result 44 of the second process 20 (e.g., from a previous iteration of the processing workload 16), or may provide a partial result 46 of the second process 20. The processor device 12 may then persist an internal state 48 of the second process 20 for continued execution during a next iteration of the processing workload 16.

It is to be understood that, while the processing workload 16 of FIG. 1 is shown as comprising a single fixed-execution-time process 18 and a single adjustable-execution-time process 20, the operations described above with respect to FIG. 1 are equally applicable to embodiments in which a processing workload includes multiple fixed-execution-time processes and/or multiple adjustable-execution-time processes. In such embodiments, the maximum cycle time interval would be determined as a sum of the fixed execution time interval(s) for the multiple fixed-execution-time process(es) and the adjustable execution time interval(s) for the multiple adjustable-execution-time process(es). Likewise, the maximum execution time interval for the adjustable-execution-time process(es) would be calculated based on the maximum cycle time interval and the fixed execution time interval(s) for the multiple fixed-execution-time process(es). In embodiments with multiple adjustable-execution-time processes, the processor device 12 could independently modify the adjustable execution time interval for each of the adjustable-execution-time processes to ensure that all of the adjustable-execution-time processes are able to execute within the maximum execution time interval.

Figure 2:
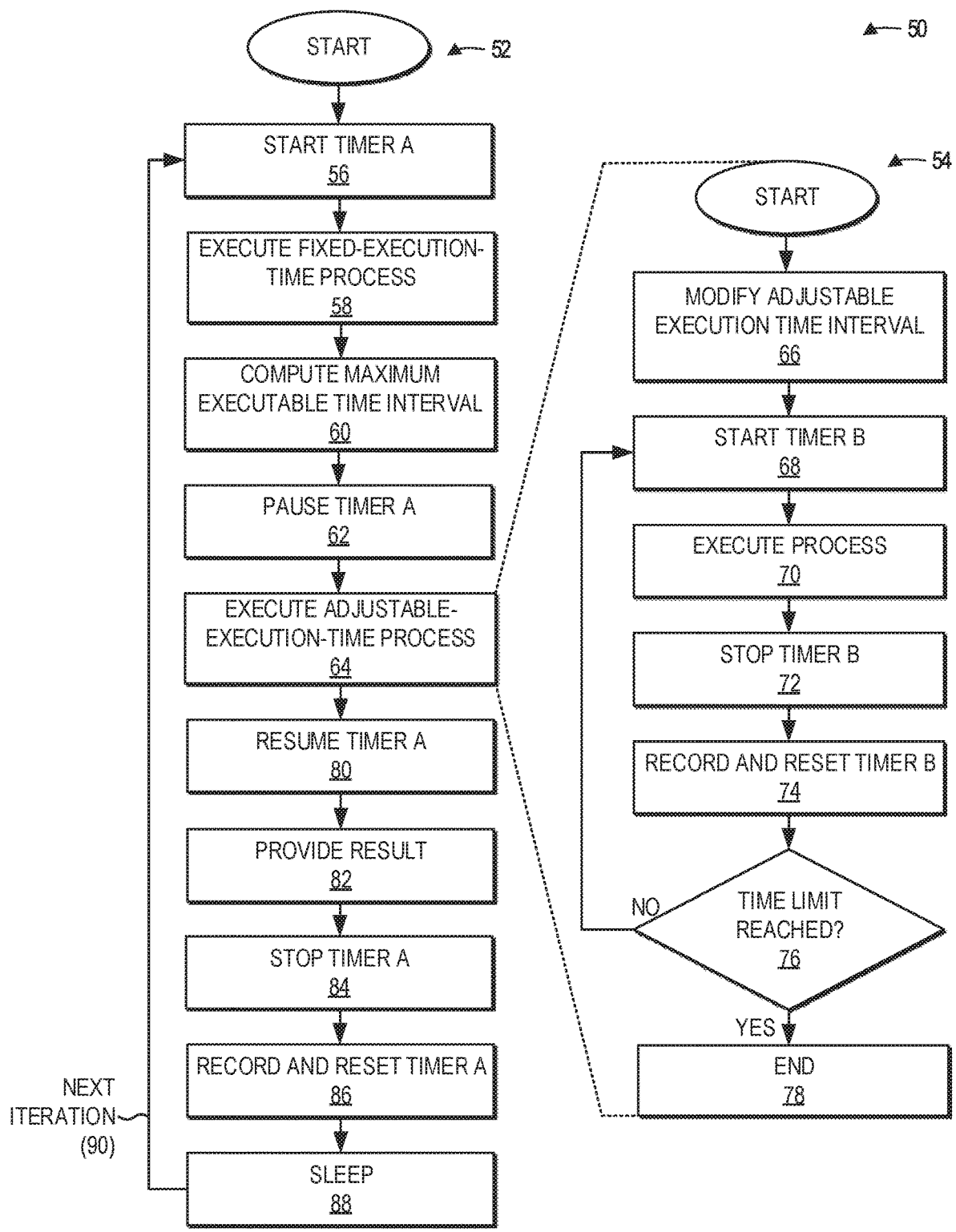
FIG. 2 is a flowchart illustrating execution of the exemplary processing workload of FIG. 1 comprising a fixed-execution-time process and an adjustable-execution-time process, according to one example.

FIG. 2 illustrates execution of an exemplary processing workload 50 (corresponding to the processing workload 16 of FIG. 1) according to one example. In FIG. 2, a flow 52 represents operations for executing an exemplary fixed-execution-time process (such as the first process 18 of FIG. 1), and therefore the time required to execute the flow 52 corresponds to the fixed execution time interval 24 of FIG. 1. Likewise, a flow 54 of FIG. 2 represents operations for executing an exemplary adjustable-execution-time process (such as the second process 20 of FIG. 1), and thus the time required to execute the flow 54 corresponds to the adjustable execution time interval 26 of FIG. 1. Execution of the flow 52 and the flow 54 occurs within a maximum cycle time interval for the processing workload 50.

Operations in the example of FIG. 2 begin in the flow 52, with the processor device 12 starting a timer A (such as the timer 30 of FIG. 1) (block 56). The processor device 12 then begins execution of the fixed-execution-time process (block 58). The operations of block 58 may include any operations required to be performed as part of the fixed-execution-time process prior to beginning execution of the adjustable-execution-time process of flow 54. Subsequently, the processor device 12 computes the maximum executable time interval for the adjustable-execution-time process (corresponding to the maximum execution time interval 28 for the second process 20 of FIG. 1) (block 60). The processor device 12 then pauses timer A (block 62), and begins execution of the adjustable-execution-time process (block 64). Operations then resume at block 66 of the flow 54.

In the flow 54, the processor device 12 first modifies the adjustable execution time interval for the adjustable-execution-time process (e.g., to ensure that the operations of the flow 54 are completed within the maximum executable time interval calculated at block 60) (block 66). The processor device 12 then starts a timer B (such as the timer 40 of FIG. 1) (block 68), and executes the operations constituting the adjustable-execution-time process (block 70). When the operations of block 70 are complete, the processor device 12 stops the timer B (block 72), and records and resets the timer B (block 74). As discussed above, recording the timer B may enable the processor device 12 to track execution times of the adjustable-execution-time process over multiple iterations, and subsequently use the tracked execution times to modify the adjustable execution time interval during future iterations of the processing workload 50.

The processor device 12 then determines whether the time limit imposed by the maximum executable time interval calculated at block 60 of the flow 52 has been reached (block 76). If not, operations continue at block 68. However, if the processor device 12 determines at decision block 76 that the time limit imposed by the maximum executable time interval has been reached, execution of the adjustable-execution-time process ends (block 78), and execution of the fixed-execution-time process resumes at block 80 of the flow 52.

Returning to the flow 52, the processor device 12 resumes the timer A (block 80). The processor device 12 then provides the result of the current iteration of the processing workflow 50 (block 82). The processor device 12 stops the timer A (block 84), and records and resets the timer A (block 86). As noted above, recording the timer A may enable the processor device 12 to track and average execution times of the fixed-execution-time process over multiple iterations, which may allow the maximum execution time interval for the adjustable-execution-time process to be more precisely calculated. If time remains within the maximum cycle time interval for the processing workload 50, the processor device 12 enters a sleep mode (block 88). A next iteration 90 of the processing workload 50 then begins again, with operations resuming at block 56 of the flow 52.

Figure 3A:
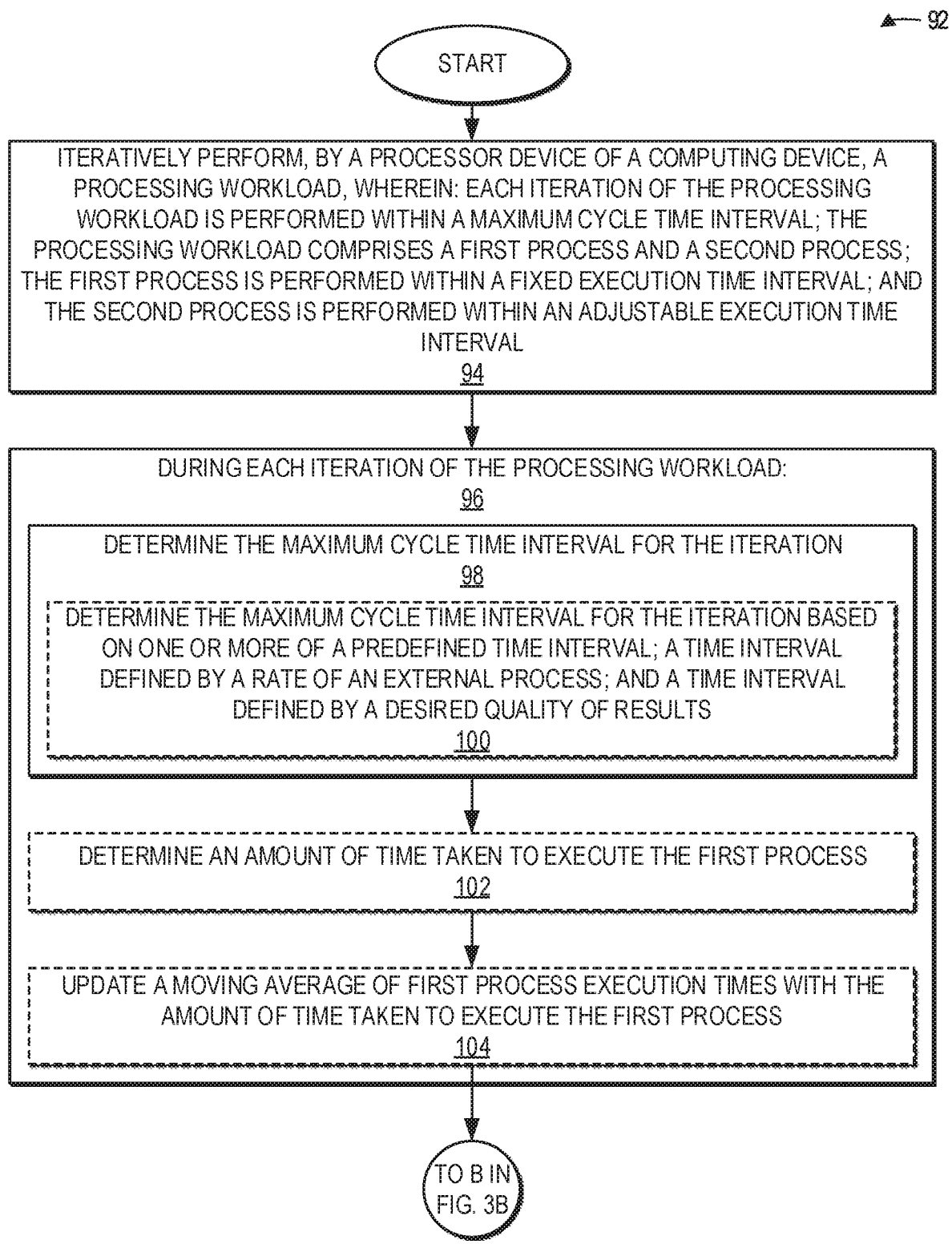
FIGS. 3A-3C are flowcharts illustrating exemplary operations for scheduling multiple processes with varying delay sensitivity, according to one example.
Figure 3B:
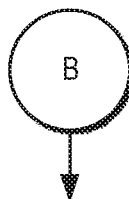
Figure 3B:
Figure 3C:
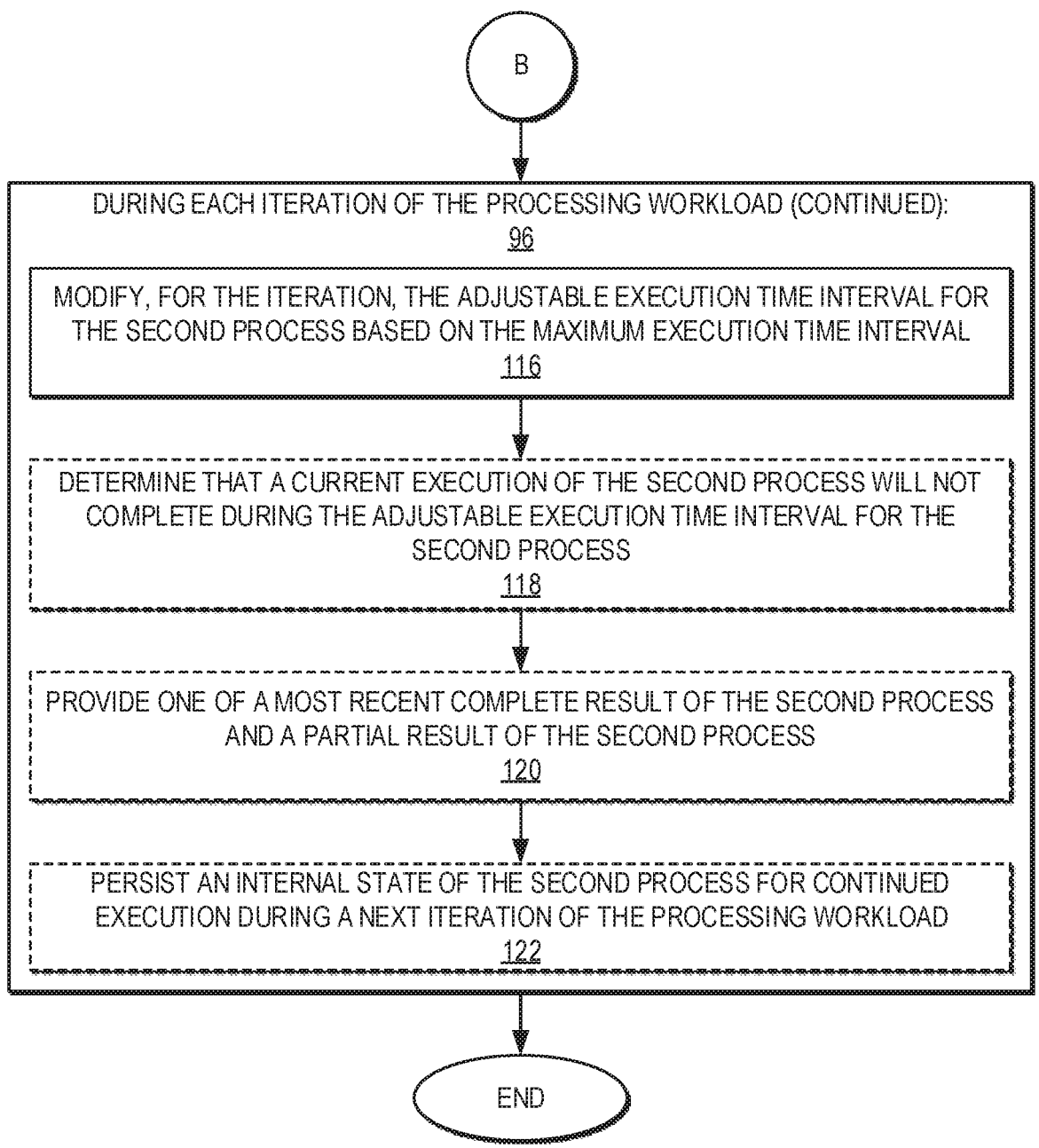

FIGS. 3A-3C provide a flowchart 92 illustrating exemplary operations for scheduling multiple processes with varying delay sensitivity, according to one example. For the sake of clarity, elements of FIG. 1 are referenced in describing FIGS. 3A-3C. In FIG. 3A, operations begin with the processor device 12 of the computing device 10 iteratively performing the processing workload 16, wherein each iteration of the processing workload 16 is performed within the maximum cycle time interval 22, the processing workload 16 comprises the first process 18 and the second process 20, the first process 18 is performed within the fixed execution time interval 24, and the second process 20 is performed within the adjustable execution time interval 26 (block 94).

Next, during each iteration of the processing workload 16, the processor device 12 performs a series of operations (block 96). The processor device 12 determines, for the iteration, the maximum cycle time interval 22 for the iteration (block 98). In some examples, operations of block 98 for determining the maximum cycle time interval 22 may include determining the maximum cycle time interval 22 for the iteration based on one or more of a predefined time interval; a time interval defined by a rate of an external process; and a time interval defined by a desired quality of results (block 100). In some examples, the processor device 12 may also determine an amount of time taken to execute the first process 18 (block 102). The processor device 12 may then update the moving average 32 of first process execution times with the amount of time taken to execute the first process 18 (block 104). Operations then continue at block 106 of FIG. 3B.

Referring now to FIG. 3B, the processor device 12 continues performing operations during each iteration of the processing workload 16 (block 96). The processor device 12 determines, for the iteration, a maximum execution time interval 28 for the second process 20 based on the maximum cycle time interval 22 and the fixed execution time interval 24 (block 106). In some examples, the maximum execution time interval 28 for the second process 20 may comprise a difference between the maximum cycle time interval 22 and the amount of time taken to execute the first process 18 (block 108). Some examples may provide that the maximum execution time interval 28 for the second process 20 comprises a difference between the maximum cycle time interval 22 and the moving average 32 of first process execution times (block 110). The moving average 32 of first process execution times may comprise, e.g., a weighted moving average. According to some examples, the maximum execution time interval 28 for the second process 20 comprises a difference between the maximum cycle time interval 22 and the configured execution time 34 of the first process 18 (block 112). In some examples, the maximum execution time interval 28 for the second process 20 comprises a difference between the maximum cycle time interval 22 and the predicted execution time 36 of the first process 18 generated by the ML model 38 (block 114). Operations then continue at block 116 of FIG. 3C.

Turning now to FIG. 3C, the processor device 12 continues performing operations during each iteration of the processing workload 16 (block 96). The processor device 12 modifies, for the iteration, the adjustable execution time interval 26 for the second process 20 based on the maximum execution time interval 28 (block 116). Exemplary operations for modifying the adjustable execution time interval 26 for the second process 20 are discussed in greater detail below with respect to FIG. 4.

In some examples, the processor device 12 may determine that a current execution of the second process 20 will not complete during the adjustable execution time interval 26 for the second process 20 (block 118). In response, the processor device 12 may provide one of a most recent complete result 44 of the second process 20 and a partial result 46 of the second process 20 (block 120). The processor device 12 may also persist an internal state 48 of the second process 20 for continued execution during a next iteration of the processing workload 16 (block 122).

Figure 4:
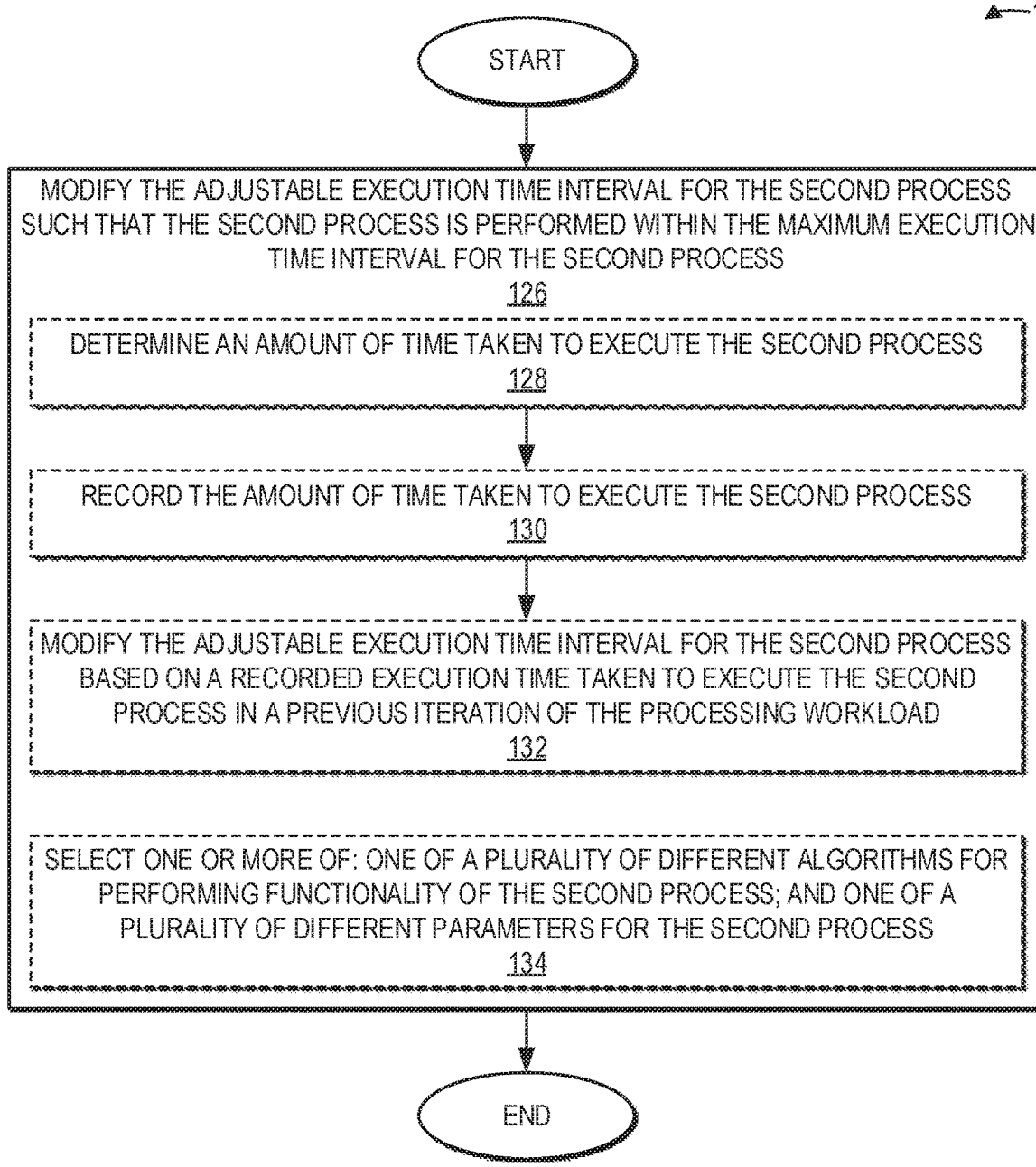
FIG. 4 is a flowchart illustrating exemplary operations for modifying an adjustable execution time interval for an adjustable-execution-time process, according to one example.

To illustrate exemplary operations for modifying an adjustable execution time interval for an adjustable-execution-time process according to one example, FIG. 4 provides a flowchart 124. Elements of FIG. 1 are referenced in describing FIG. 4 for the sake of clarity. It is to be understood that the operations illustrated in FIG. 4 may correspond to the operations for modifying the adjustable execution time interval 26 described in block 116 of FIG. 3C. Thus, in some examples, the processor device 12 may modify the adjustable execution time interval 26 for the second process 20 such that the second process 20 is performed within the maximum execution time interval 28 for the second process 20 (block 126). Some examples may provide that the operations of block 126 for modifying the adjustable execution time interval 26 for the second process 20 such that the second process 20 is performed within the maximum execution time interval 28 for the second process 20 may include the processor device 12 first determining an amount of time taken to execute the second process 20 (block 128). The processor device 12 in such examples next records the amount of time taken to execute the second process 20 (i.e., as the recorded execution time 42) (block 130). The processor device 12 then modifies the adjustable execution time interval 26 for the second process 20 based on the recorded execution time 42 taken to execute the second process 20 in a previous iteration of the processing workload 16 (block 132). In some examples, the operations of block 126 for modifying the adjustable execution time interval 26 for the second process 20 such that the second process 20 is performed within the maximum execution time interval 28 for the second process 20 include the processor device 12 selecting one or more of one of a plurality of different algorithms for performing functionality of the second process 20, and one of a plurality of different parameters for the second process 20 (block 134).

Figure 5:
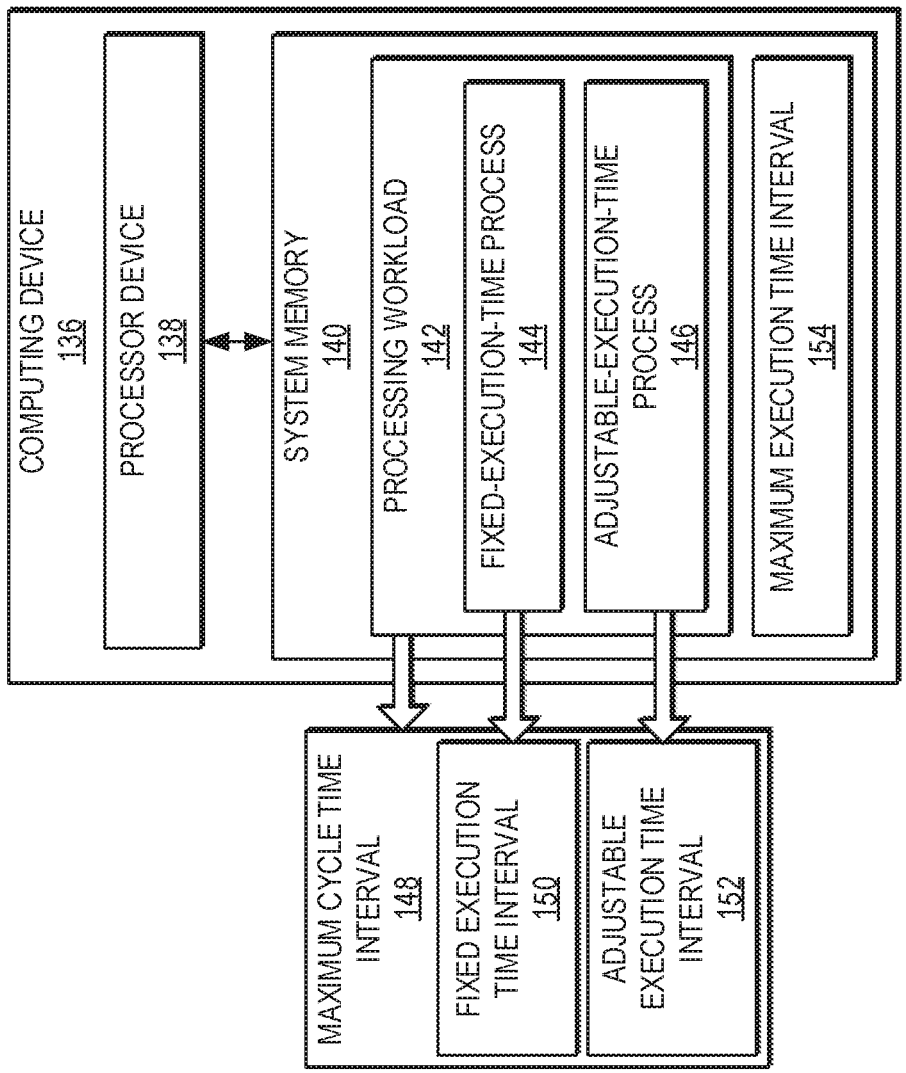
FIG. 5 is a simpler block diagram of the computing device of FIG. 1 for scheduling multiple processes with varying delay sensitivity, according to one example.

FIG. 5 is a simpler block diagram of the computing device 10 of FIG. 1 for scheduling multiple processes with varying delay sensitivity, according to one example. In FIG. 5, a computing device 136 includes a processor device 138 communicatively coupled to a system memory 140. The processor device 138 of FIG. 5 iteratively executes a processing workload 142 that includes a fixed-execution-time process 144 (referred to herein as a "first process 144") and an adjustable-execution-time process 146 (referred to herein as a "second process 146"). Each iteration of the processing workload 142 is associated with a maximum cycle time interval 148 during which the iteration is executed, and which may vary between iterations of the processing workload 142. Additionally, the first process 144 is associated with a fixed execution time interval 150, while the second process 146 is associated with an adjustable execution time interval 152.

During each iteration of the processing workload 142, the processor device 138 first determines, for that iteration, the maximum cycle time interval 148. The processor device 138 further determines a maximum execution time interval 154 for the second process 146, based on the maximum cycle time interval 148 and the fixed execution time interval 150. Once the maximum execution time interval 154 for the second process 146 is determined, the processor device 138 modifies the adjustable execution time interval 152 for the current iteration of the processing workload 142 based on the maximum execution time interval 154.

Figure 6:
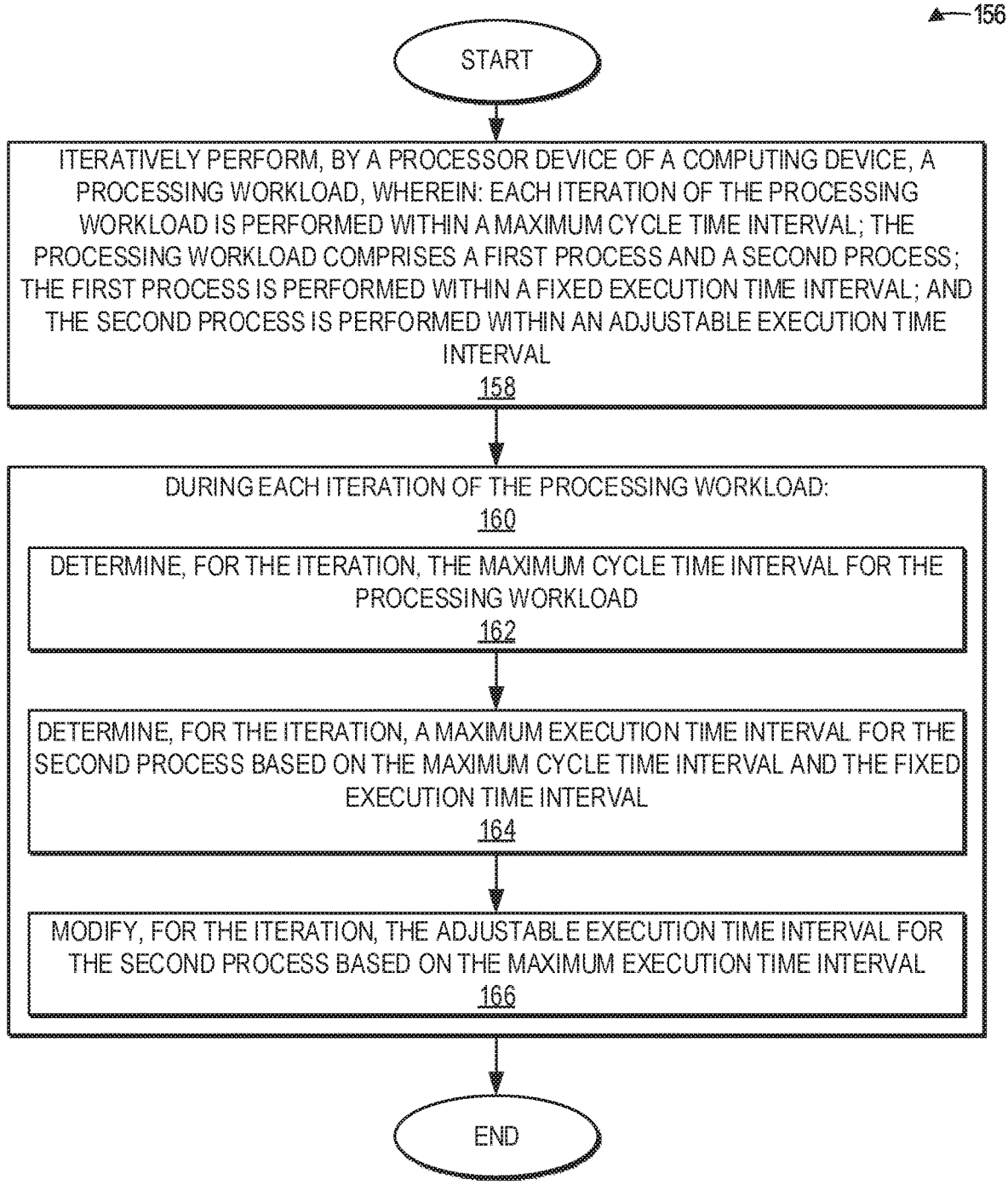
FIG. 6 is a flowchart of a simplified method for scheduling multiple processes with varying delay sensitivity on the computing device of FIG. 5, according to one example.

FIG. 6 provides a flowchart 156 illustrating a simplified method for scheduling multiple processes with varying delay sensitivity on the computing device 136 of FIG. 5, according to one example. Elements of FIG. 5 are referenced in describing FIG. 6 for the sake of clarity. Operations in FIG. 6 begin with the processor device 138 of the computing device 136 iteratively performing the processing workload 142, wherein each iteration of the processing workload 142 is performed within a maximum cycle time interval 148, the processing workload 142 comprises the first process 144 and the second process 146, the first process 144 is performed within the fixed execution time interval 150, and the second process 146 is performed within the adjustable execution time interval 152 (block 158). The processor device 138 then performs a series of operations during each iteration of the processing workload 142 (block 160). The processor device 138 determines, for the iteration, the maximum cycle time interval 148 for the processing workload 142 (block 162). The processor device 138 next determines, for the iteration, a maximum execution time interval 154 for the second process 146 based on the maximum cycle time interval 148 and the fixed execution time interval 150 (block 164). The processor device 138 then modifies, for the iteration, the adjustable execution time interval 152 for the second process 146 based on the maximum execution time interval 154 (block 166).

Figure 7:
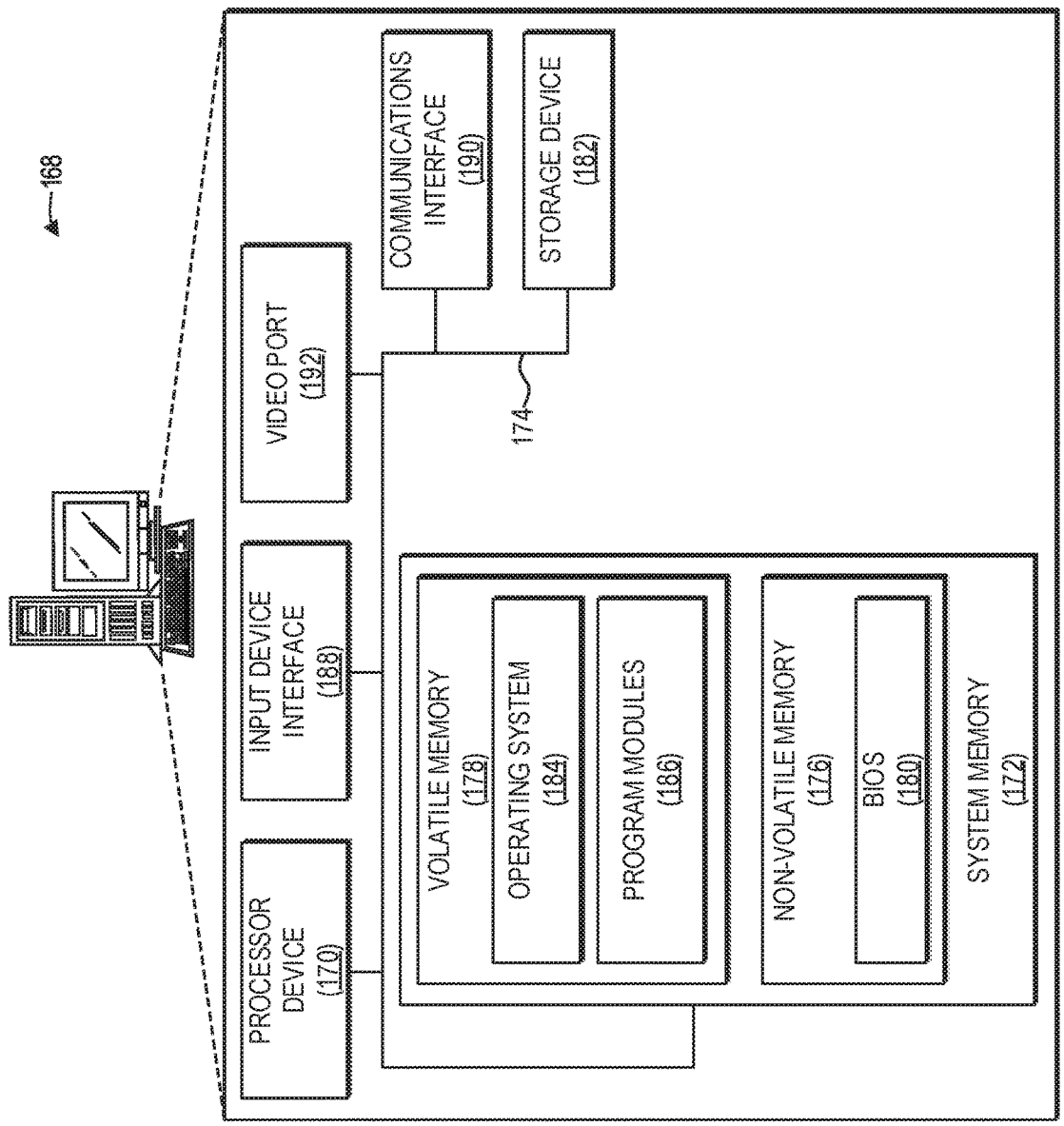
FIG. 7 is a block diagram of a computing device suitable for implementing examples, according to one example.

FIG. 7 is a block diagram of a computing device 168, such as the computing device 10 of FIG. 1 or the computing device 136 of FIG. 5, suitable for implementing examples according to one example. The computing device 168 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 168 includes a processor device 170, a system memory 172, and a system bus 174. The system bus 174 provides an interface for system components including, but not limited to, the system memory 172 and the processor device 170. The processor device 170 can be any commercially available or proprietary processor.

The system bus 174 may be any of several types of bus structures that may further interconnect to a memory bus (with or without a memory controller), a peripheral bus, and/or a local bus using any of a variety of commercially available bus architectures. The system memory 172 may include non-volatile memory 176 (e.g., read-only memory (ROM), erasable programmable ROM (EPROM), electrically EPROM (EEPROM), etc.), and volatile memory 178 (e.g., random access memory (RAM)). A basic input/output system (BIOS) 180 may be stored in the non-volatile memory 176 and can include the basic routines that help to transfer information among elements within the computing device 168. The volatile memory 178 may also include a high-speed RAM, such as static RAM, for caching data.

The computing device 168 may further include or be coupled to a non-transitory computer-readable storage medium such as a storage device 182, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 182 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 182 and in the volatile memory 178, including an operating system 184 and one or more program modules 186 which may implement the functionality described herein in whole or in part. It is to be appreciated that the examples can be implemented with various commercially available operating systems 184 or combinations of operating systems 184. All or a portion of the examples may be implemented as a computer program product stored on a transitory or non-transitory computer-usable or computer-readable storage medium, such as the storage device 182, which includes complex programming instructions, such as complex computer-readable program code, to cause the processor device 170 to carry out the steps described herein. Thus, the computer-readable program code can comprise software instructions for implementing the functionality of the examples described herein when executed on the processor device 170. The processor device 170 may serve as a controller, or control system, for the computing device 168 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 170 through an input device interface 188 that is coupled to the system bus 174 but can be connected by other interfaces, such as a parallel port, an Institute of Electrical and Electronic Engineers (IEEE) 13170 serial port, a Universal Serial Bus (USB) port, an infrared (IR) interface, and the like.

The computing device 168 may also include a communications interface 190 suitable for communicating with a network as appropriate or desired. The computing device 168 may also include a video port 192 to interface with a display device to provide information to a user. Individuals will recognize improvements and modifications to the preferred examples of the disclosure. All such improvements and modifications are considered within the scope of the concepts disclosed herein and the claims that follow.

What is claimed is:

1. A method comprising:
   iteratively performing, by a processor device of a computing device, a processing workload, wherein:
     each iteration of the processing workload is performed within a maximum cycle time interval;
     the processing workload comprises a first process and a second process;
     the first process is performed within a fixed execution time interval; and
     the second process is performed within an adjustable execution time interval; and
   during each iteration of the processing workload:
     determining the maximum cycle time interval for the iteration;
     calculating, for the iteration, a maximum execution time interval for the second process based on the maximum cycle time interval and the fixed execution time interval; and
     modifying, for the iteration, the adjustable execution time interval for the second process based on the maximum execution time interval such that the second process is performed within the maximum execution time interval for the second process.

2. The method of claim 1, wherein determining the maximum cycle time interval for the iteration is based on one or more of:
   a predefined time interval;
   a time interval defined by a rate of an external process; and
   a time interval defined by a desired quality of results.

3. The method of claim 1, further comprising, during each iteration of the processing workload, determining an amount of time taken to execute the first process;
   wherein the maximum execution time interval for the second process comprises a difference between the maximum cycle time interval and the amount of time taken to execute the first process.

4. The method of claim 1, further comprising, during each iteration of the processing workload:
   determining an amount of time taken to execute the first process; and updating a moving average of first process execution times with the amount of time taken to execute the first process;
wherein the maximum execution time interval for the second process comprises a difference between the maximum cycle time interval and the moving average of first process execution times.

5. The method of claim 4, wherein the moving average of first process execution times comprises a weighted moving average of first process execution times.

6. The method of claim 1, wherein the maximum execution time interval for the second process comprises a difference between the maximum cycle time interval and one or more of a configured execution time of the first process and a predicted execution time of the first process generated by a machine learning (ML) model.

7. The method of claim 1, wherein modifying, for the iteration, the adjustable execution time interval for the second process based on the maximum execution time interval comprises modifying the adjustable execution time interval for the second process such that the second process is performed within the maximum execution time interval for the second process.

8. The method of claim 7, wherein modifying the adjustable execution time interval for the second process such that the second process is performed within the maximum execution time interval for the second process comprises:
determining an amount of time taken to execute the second process;
recording the amount of time taken to execute the second process; and
modifying the adjustable execution time interval for the second process based on a recorded execution time taken to execute the second process in a previous iteration of the processing workload.

9. The method of claim 7, wherein modifying the adjustable execution time interval for the second process such that the second process is performed within the maximum execution time interval for the second process comprises selecting one or more of:
one of a plurality of different algorithms for performing functionality of the second process; and
one of a plurality of different parameters for the second process.

10. The method of claim 1, further comprising, during each iteration of the processing workload:
determining that a current execution of the second process will not complete during the adjustable execution time interval for the second process; and
persisting an internal state of the second process for continued execution during a next iteration of the processing workload.

11. The method of claim 10, further comprising, prior to persisting the internal state of the second process, providing one of a most recent complete result of the second process and a partial result of the second process.

12. A computing device, comprising:
a system memory; and
a processor device coupled to the system memory to:
iteratively perform a processing workload, wherein:
each iteration of the processing workload is performed within a maximum cycle time interval;
the processing workload comprises a first process and a second process;
the first process is performed within a fixed execution time interval; and
the second process is performed within an adjustable execution time interval; and
during each iteration of the processing workload:
determine, for the iteration, the maximum cycle time interval for the iteration;
calculate, for the iteration, a maximum execution time interval for the second process based on the maximum cycle time interval and the fixed execution time interval; and
modify, for the iteration, the adjustable execution time interval for the second process based on the maximum execution time interval such that the second process is performed within the maximum execution time interval for the second process.

13. The computing device of claim 12, wherein the processor device is to determine the maximum cycle time interval for the iteration based on one or more of:
a predefined time interval;
a time interval defined by a rate of an external process; and
a time interval defined by a desired quality of results.

14. The computing device of claim 12, wherein the processor device is further to, during each iteration of the processing workload, determine an amount of time taken to execute the first process;
wherein the maximum execution time interval for the second process comprises a difference between the maximum cycle time interval and the amount of time taken to execute the first process.

15. The computing device of claim 12, wherein the processor device is further to, during each iteration of the processing workload:
determine an amount of time taken to execute the first process; and
update a moving average of first process execution times with the amount of time taken to execute the first process;
wherein the maximum execution time interval for the second process comprises a difference between the maximum cycle time interval and the moving average of first process execution times.

16. The computing device of claim 12, wherein the maximum execution time interval for the second process comprises a difference between the maximum cycle time interval and one or more of a configured execution time of the first process and a predicted execution time of the first process generated by a machine learning (ML) model.

17. The computing device of claim 12, wherein to modify, for the iteration, the adjustable execution time interval for the second process based on the maximum execution time interval is to modify the adjustable execution time interval for the second process such that the second process is performed within the maximum execution time interval for the second process.

18. The computing device of claim 17, wherein to modify the adjustable execution time interval for the second process such that the second process is performed within the maximum execution time interval for the second process is to:
determine an amount of time taken to execute the second process;
record the amount of time taken to execute the second process; and
modify the adjustable execution time interval for the second process based on a recorded execution time taken to execute the second process in a previous iteration of the processing workload.

19. The computing device of claim 17, wherein to modify the adjustable execution time interval for the second process such that the second process is performed within the maximum execution time interval for the second process is to select one or more of:
- one of a plurality of different algorithms for performing functionality of the second process; and
- one of a plurality of different parameters for the second process.

20. A non-transitory computer-readable medium having stored thereon computer-executable instructions which, when executed by a processor device, cause the processor device to:
- iteratively perform a processing workload, wherein:
  - each iteration of the processing workload is performed within a maximum cycle time interval;
  - the processing workload comprises a first process and a second process;
  - the first process is performed within a fixed execution time interval; and
  - the second process is performed within an adjustable execution time interval; and
- during each iteration of the processing workload:
  - determine, for the iteration, the maximum cycle time interval for the iteration;
  - calculate, for the iteration, a maximum execution time interval for the second process based on the maximum cycle time interval and the fixed execution time interval; and
  - modify, for the iteration, the adjustable execution time interval for the second process based on the maximum execution time interval such that the second process is performed within the maximum execution time interval for the second process.

\* \* \* \* \*